United States Patent [19]

Carson

[11] Patent Number: 4,480,895
[45] Date of Patent: Nov. 6, 1984

[54] ADJUSTABLE REFLECTOR APPARATUS

[76] Inventor: William M. Carson, 4032 Coogan Cir., Culver City, Calif. 90230

[21] Appl. No.: 324,567

[22] Filed: Nov. 24, 1981

[51] Int. Cl.³ ............................ G02B 5/08; G02B 5/10
[52] U.S. Cl. ................................... 350/623; 350/626
[58] Field of Search ........................ 350/299, 304, 309

[56] References Cited

U.S. PATENT DOCUMENTS

| | | |
|---|---|---|
| 3,054,326 | 9/1962 | Giesecke . |
| 3,084,596 | 4/1963 | Radin . |
| 3,227,043 | 1/1966 | Swimmer et al. . |
| 3,343,279 | 9/1967 | Elkins ................................ 350/299 |
| 3,512,892 | 5/1970 | Jorris . |
| 4,174,154 | 11/1979 | Kawasaki . |
| 4,206,991 | 6/1980 | Kobori et al. . |

FOREIGN PATENT DOCUMENTS

| | | | |
|---|---|---|---|
| 0072065 | 6/1979 | Japan ................................... | 350/299 |
| 0007392 | of 1911 | United Kingdom ................ | 350/299 |

*Primary Examiner*—John K. Corbin
*Assistant Examiner*—Richard F. Gallivan

[57] ABSTRACT

An adjustable reflector apparatus for redirecting an incident beam of light in a direction substantially normal to its incident direction. The apparatus includes a fixed reflector assembly and a movable reflector assembly, each having a flat mirror, and a device for securing the two assemblies together such that the beam is reflected successively by the two mirrors. The apparatus further includes a special adjustment device for precisely adjusting the angle between the two mirrors, and thereby correspondingly adjusting the angle between the incident beam and the redirected beam to be precisely 90 degrees.

9 Claims, 7 Drawing Figures

U.S. Patent  Nov. 6, 1984  Sheet 1 of 2  4,480,895
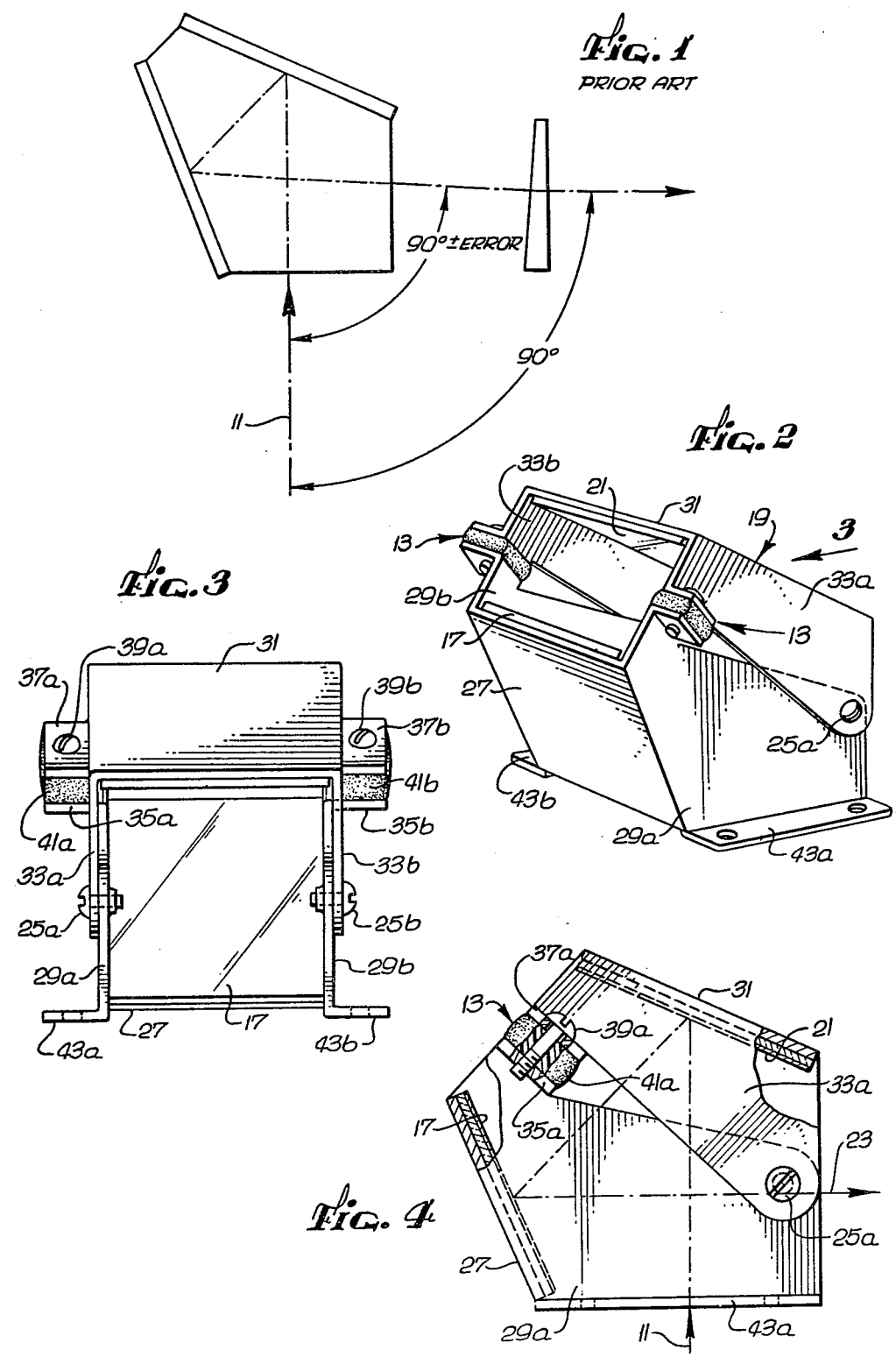

ADJUSTABLE REFLECTOR APPARATUS

BACKGROUND OF THE INVENTION

This invention relates generally to optical devices for redirecting a light beam at a prescribed angle relative to its incident direction, and, more particularly, to devices that redirect a light beam in a direction substantially normal to its incident direction.

Optical devices of this type are of particular use in rotating laser beam transmitters, which project a laser beam along a generally horizontal axis while rotating about a vertical axis. This defines a plane of light useful in numerous construction, agricultural and surveying applications.

An example of a prior optical device of this particular type is a pentagonal reflector device having a pair of five-sided side frames for mounting a two flat mirrors. The first mirror is oriented with its normal axis at an angle of about 22.5 degrees to the nominal axis of an incident beam, such that the beam is reflected toward the second mirror along an axis at about 45 degrees to the incident axis. The second mirror is oriented with its normal axis at about 22.5 degrees to that of the once-reflected beam, such that the beam is then redirected in a direction substantially normal to its incident direction. The pentagonal reflector device need not be critically oriented with respect to the incident light beam. The beam can impinge on the first mirror from a wide range of angles, and the device will still function properly to deflect the beam by 90 degrees.

Although the reflector device described above performs satisfactorily in most applications, its manufacture can be prohibitively expensive if extreme accuracy in the amount of angular deflection is required. FIG. 1 depicts one known apparatus for overcoming this prohibitive expense, while still achieving a high level of accuracy. The side frames and mirrors of this apparatus are formed with less precision, but the apparatus requires the addition of a wedge-shaped lens. The lens is rotated to a position such that it refracts the beam by an amount that compensates for the device's angular error. This solution is not completely satisfactory, however, because it requires inclusion of an additional optical element, and because this additional element can sometimes disperse the beam of light by an excessive amount.

It should therefore be appreciated that there is a need for an optical device for redirecting an incident beam of light by a prescribed angle that can be precisely selected without incurring prohibitive expense and without the need for a separate optical element. The present invention fulfills this need.

SUMMARY OF THE INVENTION

The present invention is embodied in an adjustment reflector apparatus for redirecting an incident beam of light in a prescribed direction relative to its incident direction. The apparatus includes first and second reflective means, and means for securing the two reflective means together such that they successively reflect the incident beam and thereby redirect it in a direction substantially normal to its incident direction. In accordance with the invention, the apparatus further includes adjustment means for adjusting the angle between the first and second reflective means, to adjust correspondingly the direction of the redirected beam. The adjustment means is used to adjust the angle between the incident and reflected beams to be precisely 90 degrees, and it maintains its adjusted position in all relative orientations, even in the presence of shock and vibration.

More particularly, the adjustment means includes a screw for coupling the first reflective means to the second reflective means, and means for biasing the first means relative to the second means in a prescribed fashion. Rotation of the screw adjusts the angle between the first and second reflective means, and the means for biasing biases the two means toward or apart from each other to secure the screw in its adjusted position.

In one embodiment, the first and second reflective means each include a flat reflective surface, and the means for securing pivotally secures the two reflective means together such that the angle between their respective reflective surfaces is controllably variable. The first and second reflective means are each preferably U-shaped, having a center segment defining the flat reflective surface and having first and second legs projecting in the same direction from opposite sides of the center segment. The remote ends of the respective legs carry the means for pivotally securing.

In this embodiment, the adjustment means includes a plurality of lugs projecting outwardly from the legs of the first and second reflective means. Each leg carries at least one lug spaced from its remote end, and the lugs carried by the first reflective means are disposed in spaced, confronting relationship to the lugs carried by the second reflective means. The adjustment means further includes a pair of screws for coupling together the confronting lugs, and means for pivotally biasing the first and second reflective means with respect to each other. Rotation of the screws changes the spacing between the lugs, and thereby changes the angle between the respective reflective surfaces of the first and second means. The means for biasing preferably includes a pair of compressible, ring-shaped spacers, each spacer disposed between a separate pair of confronting lugs, surrounding the corresponding screw.

In another embodiment, the means for securing secures the first and second reflective means rigidly together, and the legs of one of the two reflective means are bendable. The adjustment means controllably bends the bendable legs, so as to vary the angle between the two reflective surfaces and thereby redirect the light beam in the prescribed fashion.

Other aspects and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 1 is a side view of a prior art pentagonal reflector assembly;

FIG. 2 is a perspective view of a first embodiment of an adjustable reflector device in accordance with the present invention;

FIG. 3 is a right side elevational view of the reflector device of FIG. 2;

FIG. 4 is a front elevational view of the reflector device of FIG. 2, with portions of the device cut away to reveal its two mirrors;

DESCRIPTION OF THE PREFERRED EMBODIMENT

Figure 5:
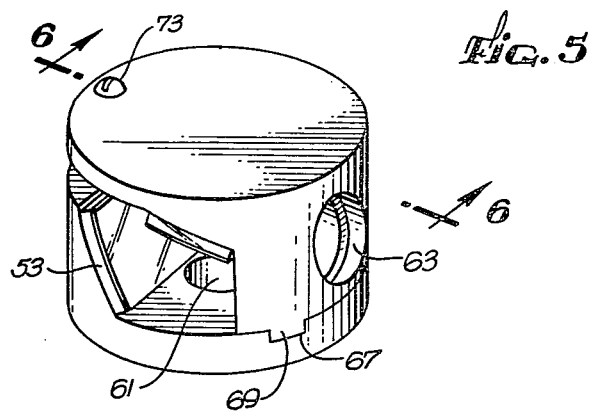
FIG. 5 is a perspective view of a second embodiment of an adjustable reflector device in accordance with the present invention.

Referring now to the drawings, and particularly to FIGS. 2-4, there is shown a first embodiment of an adjustable reflector device constructed in accordance with the present invention, for redirecting an incident beam of light 11 in a direction substantially normal to its incident direction. The device includes special adjustment means 13 for use in accurately adjusting the angle between the incident beam and the redirected beam. It redirects the beam with extreme accuracy, yet it has a relatively simple structure and is inexpensive to construct.

The reflector device of FIGS. 2-4 includes a fixed reflector assembly 15 having a flat, front surface mirror 17, and a movable reflector assembly 19 likewise having a flat, front surface mirror 21. The two assemblies are secured to each other such that an incident beam of light 11 is reflected successively by the movable assembly mirror 21 and the fixed assembly mirror 17, to produce a redirected beam 23 substantially normal to the incident beam. The prescribed angle between the redirected and incident beams is fixed at substantially 90 degrees, regardless of the orientation of the device relative to the incident beam. So long as the incident beam impinges first on the movable assembly mirror and subsequently on the fixed assembly mirror, the device automatically deflects the beam by 90 degrees.

In accordance with the invention, the movable reflector assembly 19 is mounted on the fixed reflector assembly 15 such that the angle between the respective mirrors 21 and 17 can be controllably varied. This permits the angle between the redirected beam 23 and the incident beam 11 to be adjusted to be precisely 90 degrees. The reflector device of the first embodiment of the invention includes a pair of coaxial bolts 25a and 25b for pivotally mounting the movable assembly to the fixed assembly, and the adjustment means 13 controllably pivots the movable assembly about the axis of the bolts.

The fixed reflector assembly 15 is generally U-shaped and includes a center segment 27 carring the mirror 17 and a pair of legs or side segments 29a and 29b projecting in the same direction from opposite sides of the center segment. Similarly, the movable reflector assembly 19 is substantially U-shaped and includes a center segment 31 carrying the mirror 21 and a pair of legs or side segments 33a and 33b projecting in the same direction from opposite sides of the center segment. The bolts 25a and 25b project through througbores located in the remote ends of the movable side segments, to threadedly engage threaded bores located in the remote ends of the fixed side segments.

The adjustment means 13 controllably pivots the movable reflector assembly 19 about the axis of the shoulder bolts 25a and 25b, such that the angle between the movable assembly mirror 21 and the fixed assembly mirror 17 is precisely 45 degrees. This insures that the incident beam of light 11 is redirected by precisely 90 degrees.

The adjustment means includes a number of lugs projecting laterally outwardly from prescribed locations on the fixed and movable side segments. Specifically, the fixed side segments 29a and 29b carry lugs 35a and 35b, respectively and the movable side segments carry lugs 37a and 37b, respectively. When the fixed and movable reflector assemblies 15 and 19, respectively, are pivotally secured together, the fixed assembly lugs 35a and 35b are located in spaced, confronting relationship to the movable assembly lugs 35a and 35b. Bore holes are formed in each lug, and the adjustment means further includes a pair of adjustment screws 39a and 39b projecting through the bores of the movable lugs to threadedly engage the bores in the fixed assembly lugs. Rotation of the adjustment screws varies the spacing between the respective lugs, and thereby varies the angle between the movable mirror 21 and the fixed mirror 17. In use, the adjustment screws are controllably rotated to provide a precise 90 degree deflection of the incident beam 11.

The adjustment means 13 further includes a pair of compressible, ring-shaped spacers or O-rings 41a and 41b disposed between the confronting pairs of lugs 35 and 37, surrounding the adjustment screws 39a and 39b, respectively. The spacers are preferably compressed when the device is properly adjusted, so as to impose an axial stress on the adjustment screws. This prevents shock and vibration from rotating the screws and thereby moving the device out of its proper adjustment.

The fixed and movable reflector assemblies 15 and 19 can be conveniently formed using a conventional stamping procedure. The fixed assembly includes a pair of mounting flanges 43a and 43b by which the device can be secured to an underlying structure (not shown).

The fixed and movable mirrors 17 and 21, respectively, are preferably reflective on their front surfaces, to preclude refraction of the light beam 11 and to prevent the creation of double images. The assemblies can be conveniently formed by cementing pre-formed mirrors in place using a technique that minimizes stress. Alternatively, the assemblies can be formed using a conventional replication technique in which the mirror surfaces are transferred to machined substrates.

Figure 6:
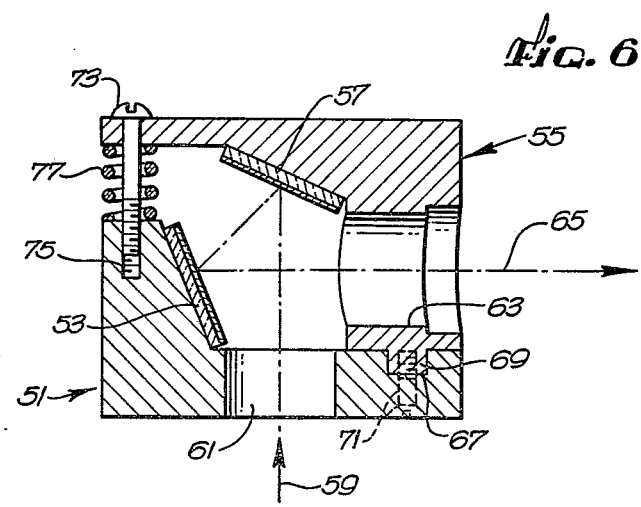
FIG. 6 is a sectional view of the reflector device of FIG. 5, taken in the direction of the arrows 6—6 in FIG. 5.
Figure 7:
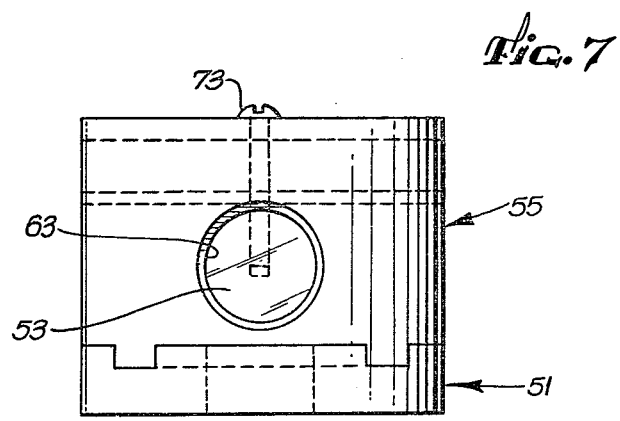
FIG. 7 is a right side elevational view of the reflector device of FIG. 5.

An alternative adjustable reflector device is depicted in FIGS. 5-7. Like the first embodiment (FIGS. 2-4), this second embodiment includes a fixed reflector assembly 51 having a flat, front surface mirror 53, and a movable reflector assembly 55 likewise having a flat, front surface mirror 57. Both assemblies are machined from cylindrical stock. As shown in FIG. 6, an incident light beam 59 projects upwardly through an aperture 61 in the fixed assembly, to impinge on the movable mirror 57. The movable mirror reflects the beam toward the fixed mirror 53, which in turn reflects it outwardly through an aperture 63 formed in the movable assembly. As in the first embodiment, the redirected beam 65 is substantially normal to the incident beam.

The movable reflector assembly 55 is aligned with respect to the fixed reflector assembly 51 by alignment means that includes a transverse channel 67 formed in the fixed assembly and a conforming elongated boss 69 formed in the movable assembly. Two set screws 71 secure the two assemblies together in the proper alignment.

The adjustment means of this second embodiment includes a single adjustment screw 73 that projects through a bore formed in a remote end of the movable reflector assembly 55, to engage a threaded bore 75 formed in the top of the fixed reflector assembly 51. Rotation of the adjustment screw causes limited bending of a portion of the movable assembly adjacent the exit aperture 63, such that the angle between the respective movable and fixed mirrors 57 and 53 can be controllably varied. The adjustment means further includes a compression spring 77 disposed between the two assemblies, surrounding the adjustment screw, to bias the two assemblies apart from each other. The spring, in combination with the bending of the movable assembly, imposes an axial stress on the adjustment screw, to prevent shock and vibration from rotating the screw and thereby moving the device out of its proper adjustment.

It should be apparent from the foregoing description that the present invention provides an improved reflector device for redirecting a beam of light in a direction substantially normal to its incident direction. The device includes a pair of reflectors for successively reflecting the beam, and special adjustment means for adjusting the relative angle between the two reflectors such that the angle between the reflected beam and the incident beam can be precisely adjusted. The device is exceedingly simple in construction, yet durable and able to maintain its adjustment in all relative orientations and even in the presence of shock and vibration.

While the invention has been illustrated and described with reference to two presently preferred embodiments, it should be understood by one of ordinary skil in the art that various modifications can be made, without departing from the spirit and scope of the invention. Accordingly, it is not intended that the invention be limited, except as by the appended claims.

I claim:

1. An adjustable reflector apparatus comprising:
   first reflective means;
   second reflective means;
   means for securing together the first and second reflective means such that they successively reflect an incident beam of light and thereby redirect the beam in a direction substantially normal to its incident direction; and
   adjustment means for adjusting the angle between the first and second reflective means and thereby correspondingly adjusting the direction of the redirected beam of light, the adjustment means including
   a screw for coupling the first reflective means to the second reflective means, rotation of the screw adjusting the angle therebetween, and
   a compressible, ring-shaped spacer disposed between the first reflective means and the second reflective means, surrounding the screw, for biasing the first and second reflective means apart from each other and thereby securing the screw in its adjusted position.

2. An apparatus as defined in claim 1, wherein the means for securing permits limited pivotal movement between the first reflective means and the second reflective means.

3. An apparatus as defined in claim 1, wherein:
   one of the first and second reflective means includes a bendable member; and
   the adjustment means bends the bendable member to adjust the angle between the first and second reflective means.

4. An adjustable reflector apparatus for redirecting an incident beam of light in a direction substantially normal to its incident direction, comprising:
   first means having a flat reflective surface;
   second means having a flat reflective surface;
   wherein the first and second means are each U-shaped, having a center segment defining the flat reflective surface and first and second legs projecting in the same direction from opposite sides of the center segment;
   third means for pivotally securing together the remote ends of the legs of the first and second means such that the angle between their respective reflective surfaces can be controllably varied; and
   adjustment means for controllably pivoting the first means relative to the second means and thereby adjusting the angle between their reflective surfaces such that the surfaces successively reflect an incident beam of light and redirect it in a direction substantially normal to its incident direction, the adjustment means including
   a screw for coupling the first means to the second means, rotation of the screw adjusting the angle between their respective reflective surfaces, and
   means for pivotally biasing the first means relative to the second means in a prescribed fashion.

5. An apparatus as defined in claim 4, wherein:
   the adjustment means further includes
   a second screw for coupling the first means to the second means, and
   a plurality of lugs projecting outwardly from the legs of the first and second means, each leg carrying at least one lug spaced from its remote end, the lugs carried by the first means being disposed in spaced, confronting relationship to the lugs carried by the second means; and
   the screws couple together the lugs carried by the respective first and second means, rotation of the screws changing the spacing between the respective lugs and thereby changing the angle between the respective reflective surfaces.

6. An apparatus as defined in claim 8, wherein:
   the means for biasing includes a pair of compressible, ring-shaped spacers, each spacer disposed between a separate pair of confronting lugs, surrounding the corresponding screw; and
   the spacers bias the respective pairs of confronting lugs apart from each other and thereby secure the first and second screws in their adjusted positions.

7. An adjustable reflector apparatus for redirecting an incident beam of light in a direction substantially normal to its incident direction, comprising:
   first and second U-shaped reflective means, each including a center segment defining a flat reflective surface and first and second parallel legs projecting in the same direction from opposite sides of the center segment;
   means for pivotally securing together the remote ends of the legs of the first and second reflective means, such that the angle between their respective center segments can be varied; and
   adjustment means for controllably adjusting the angle between the center segments of the first and second reflective means, such that the reflective surfaces successively reflect an incident beam of light and thereby redirect it in a direction substantially normal to its incident direction, the adjustment means including
   a plurality of lugs projecting outwardly from the legs of the first and second means, each leg carrying one lug spaced from its remote end, the lugs carried by the first reflective means being disposed in spaced, confronting relationship to the lugs carried by the second reflective means, first and second screws for coupling together the respective pairs of confronting lugs, rotation of the screws changing the spacing between the confronting lugs and thereby changing the angle between the respective reflective surfaces, and first and second compressible, ring-shaped spacers, each spacer disposed between a separate pair of confronting lugs, surrounding the corresponding screw, wherein the spacers bias the respective pairs of confronting lugs apart from each other and thereby secure the first and second screws in their adjusted positions.

8. An adjustable reflector apparatus for redirecting an incident beam of light in a direction substantially normal to its incident direction, comprising:

first means having a flat reflective surface;

second means having a flat reflective surface and a bendable support leg;

third means for rigidly securing together the first and second means; and adjustment means for controllably bending the bendable support leg of the second means and thereby adjusting the angle between the reflective surfaces of the first and second means, the surfaces thereby successively reflecting an incident beam of light and redirecting it in a direction substantially normal to its incident direction, the adjustment means including a screw for coupling the first means to the second means, rotation of the screw adjusting the angle between their respective surfaces, and a compressible, ring-shaped spacer disposed between the first means and the second means, surrounding the screw, for biasing the first and second means apart from each other and thereby securing the screw in its adjusted position.

9. An adjustable reflector apparatus for redirecting an incident beam of light in a direction substantially normal to its incident direction, comprising:

a first U-shaped frame having a center segment and a pair of legs projecting in the same direction from opposite edges of the center segment;

a first flat, front-surface mirror secured to the center segment of the first U-shaped frame, on the same side as the pair of legs;

a second U-shaped frame having a center segment and a pair of legs projecting in the same direction from opposite edges of the center segment;

a second flat, front-surface mirror secured to the center segment of the second U-shaped frame, on the same side as the pair of legs;

pivot means for pivotally securing together the remote ends of the pairs of legs of the respective first and second U-shaped frames, such that the angle between the first and second mirrors can be varied; and adjustment means for controllably pivoting the first U-shaped frame relative to the second U-shaped frame and thereby adjusting the angle between the first and second mirrors such that they successively reflect an incident beam of light and redirect it in a direction substantially normal to its incident direction.

* * * * *